United States Patent [19]

Ikeda et al.

[11] 4,302,781
[45] Nov. 24, 1981

[54] FACSIMILE SYSTEM

[75] Inventors: Takatoshi Ikeda; Shuichi Hirano, both of Yokohama; Yasuyuki Kozima, Hitachi, all of Japan

[73] Assignee: Hitachi, Ltd., Tokyo, Japan

[21] Appl. No.: 26,603

[22] Filed: Apr. 3, 1979

[30] Foreign Application Priority Data

Apr. 3, 1978 [JP] Japan .................................. 53-38136

[51] Int. Cl.³ .............................................. H04N 7/12
[52] U.S. Cl. ................................................. 358/288
[58] Field of Search ............................... 358/288, 260

[56] References Cited

U.S. PATENT DOCUMENTS

| 2,996,581 | 8/1961 | Lord et al. | 358/133 |
| 3,201,512 | 8/1965 | Mason et al. | 358/288 |
| 3,448,207 | 6/1969 | Green et al. | 358/288 |
| 3,643,016 | 2/1972 | Dattilo | 358/288 |
| 4,186,415 | 1/1980 | Takayama | 358/260 |

FOREIGN PATENT DOCUMENTS 2747020  5/1978  Fed. Rep. of Germany ...... 358/260

OTHER PUBLICATIONS

Huang-Coding of Two-Tone Images, IEEE Trans on Comm., Nov. 1977, #11—pp. 1406-1422.

Primary Examiner—Joseph A. Orsino, Jr.
Attorney, Agent, or Firm—Craig and Antonelli

[57] ABSTRACT

A facsimile apparatus of analog type is disclosed, in which, in order to shorten the transmission time, continuous white lines of the white background of the original are read variably in number during each scanning line period. The information thus read is transmitted to the receiver in synchronism with the scanning line period. At the receiving end, the recording paper is rapidly fed for the scanning line period corresponding to the number of lines representing the received information.

3 Claims, 10 Drawing Figures

FACSIMILE SYSTEM

BACKGROUND OF THE INVENTION

Field of the Invention

The present invention relates to a facimile system, or more in particular to a facsimile system of the analog type in which the white background of the original is skipped.

Characters or patterns including drawings on an original document which are to be transmitted by a facsimile system account for only 20% to 30% of the white background of the document. Most of the time required for transmission is consumed in the scanning of the white background. In high speed transmission, this naturally requires a higher scanning speed and hence a higher maximum image current frequency, thus making it difficult to use the telephone line of limited frequency band.

In order to overcome such a shortcoming, a special modulation system, such as the vestigal side band modulation and demodulation system (VSB) or the pulse code modulation system (PCM), has be suggested, in which the transmission time is reduced by lessening the frequency band of image current. Such modulation systems, however, enable the transmission speed to be increased only at most about twice in the same frequency band of the transmission circuit.

The International Telegraph and Telephone Consultative Committee (CCITT) has suggested a specification for the analog type facsimile apparatus (medium speed facsimile) which enables transmission and receipt of the information on an original of "A4" size in about three minutes. The systems based on that specification are called the group II (GII) systems and are used for general office purposes. It takes about three minutes for the group II (GII) systems to transmit any original. In other words, the same transmission time is required regardless of how much the white background represents of the area of the original.

SUMMARY OF THE INVENTION

Accordingly, it is an object of this invention to provide a facsimile system which obviates the disadvantages of the prior art systems and in which the transmission time for an original document having a white background is reduced to less than three minutes by shortening the transmission time for the white background of the original document.

According to one aspect of the present invention, there is provided a facsimile system in which at the transmitting end, indications of continuous white lines read during each scanning line period are transmitted to the receiving end in synchronism with the scanning line period. At the receiving end, the recording paper is fed or advanced rapidly in accordance with the number of the received white lines of information indicated during the scanning line period after receipt. At the reading section, the number of white lines capable of being read for one scanning line period is made variable according to the conditions of the reading system, thus shortening the transmission time.

Another object of the present invention is to provide a facsimile system in which the number of lines read for each scanning line period is changed according to the conditions of the reading system, i.e., the brightness of the light source, thereby making it always possible to read at maximum speed.

Still another object of the present invention is to provide a fascimile system comprising a plurality of parallel memories for storing the scanning results. One of the memories stores the preceding scanning result. While the preceding scanning result is being read from that memory, the current scanning result is stored in another memory. In this way, a plurality of memories are used alternately with each other in transmitting and receiving the scanning results containing the image information, thus reducing the redundancy caused by the difference between the scanning time and transmission time.

DESCRIPTION OF THE PREFERRED EMBODIMENTS

Figure 1:
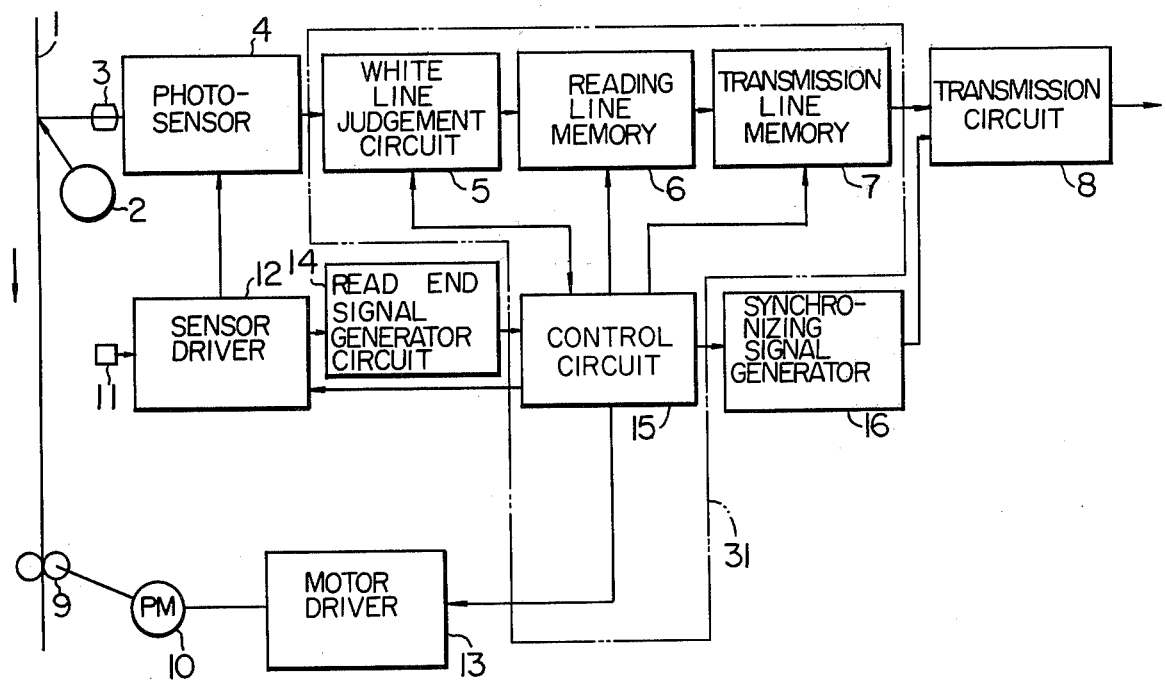
FIG. 1 is a block diagram showing a configuration of the transmission section of a facsimile system according to the present invention.

The configuration of the transmission section of a facsimile system according to the present invention is shown in FIG. 1. An original document 1 is illuminated by a fluorescent lamp 2. The image information representing one line is formed through a lens 3 and converted into an electrical signal by a photo-sensor 4. The photo-sensor 4 is driven by a sensor driver 12 controlled by a light amount sensing section 11 and a transmission control circuit 15. The output signal from the photo-sensor 4 is applied through a white line judgement circuit 5 and temporarily stored in a reading line memory 6, forming one of the sensor data memories connected in series. Upon the instructions of the control circuit 15, the signal is transferred to a transmission line memory 7, from which the signal is applied to a transmission circuit 8 including a modulation circuit which modulates the signal at a speed corresponding to the channel transmission speed and thus delivers it to the receiving end. The control circuit 15 further controls a synchronizing signal generator 16 and a motor driver 13 in response to the signals from the white line judgement circuit 5 and a read end signal generator circuit 14. In the case where white lines continue, the original 1 is rapidly fed by paper feed rollers 9 operatively interlocked with a pulse motor 10. The synchronizing signal generator 16 generates a synchronizing signal and a control signal as required and applies them through the channel via the transmission circuit 8.

Figure 2:
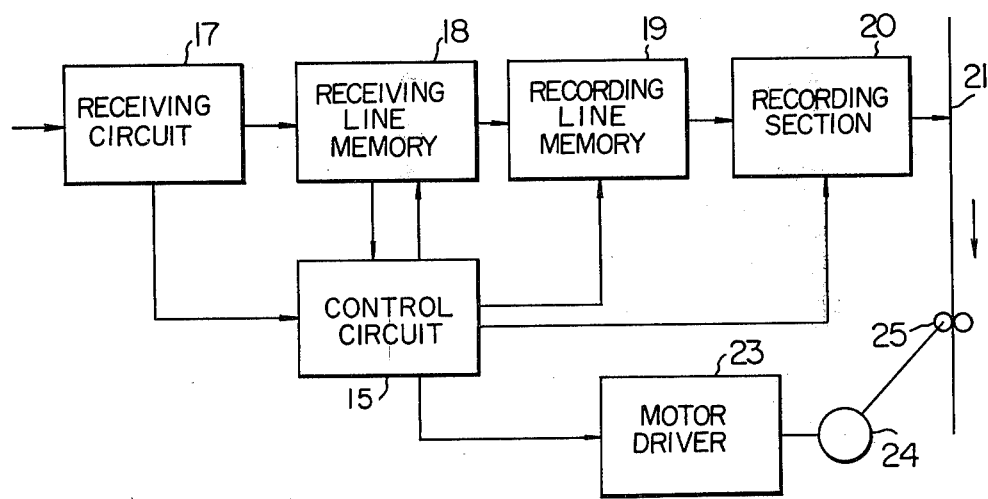
FIG. 2 is a block diagram showing a configuration of the receiving section of a facsimile system according to the present invention.

A configuration of the receiving section is shown in FIG. 2. The signal received through the channel is demodulated by a receiving circuit 17 including a demodulator is recorded on the recorder paper 21 through a receiving line memory 18 of series-connected receiving data memories, a recording line memory 19 and a recording section 20. The recording paper 21 is driven by paper feed rollers 25, a pulse motor 24 and a motor driver 23.

The control circuit 15 detects a control signal in response to a synchronizing point obtained from the receiving circuit 17 and the signal applied to the receiving line memory 18, and thus controls the receiving line memory 18, the recording line memory 19, the recording section 20 and the motor driver 23.

Figure 3:
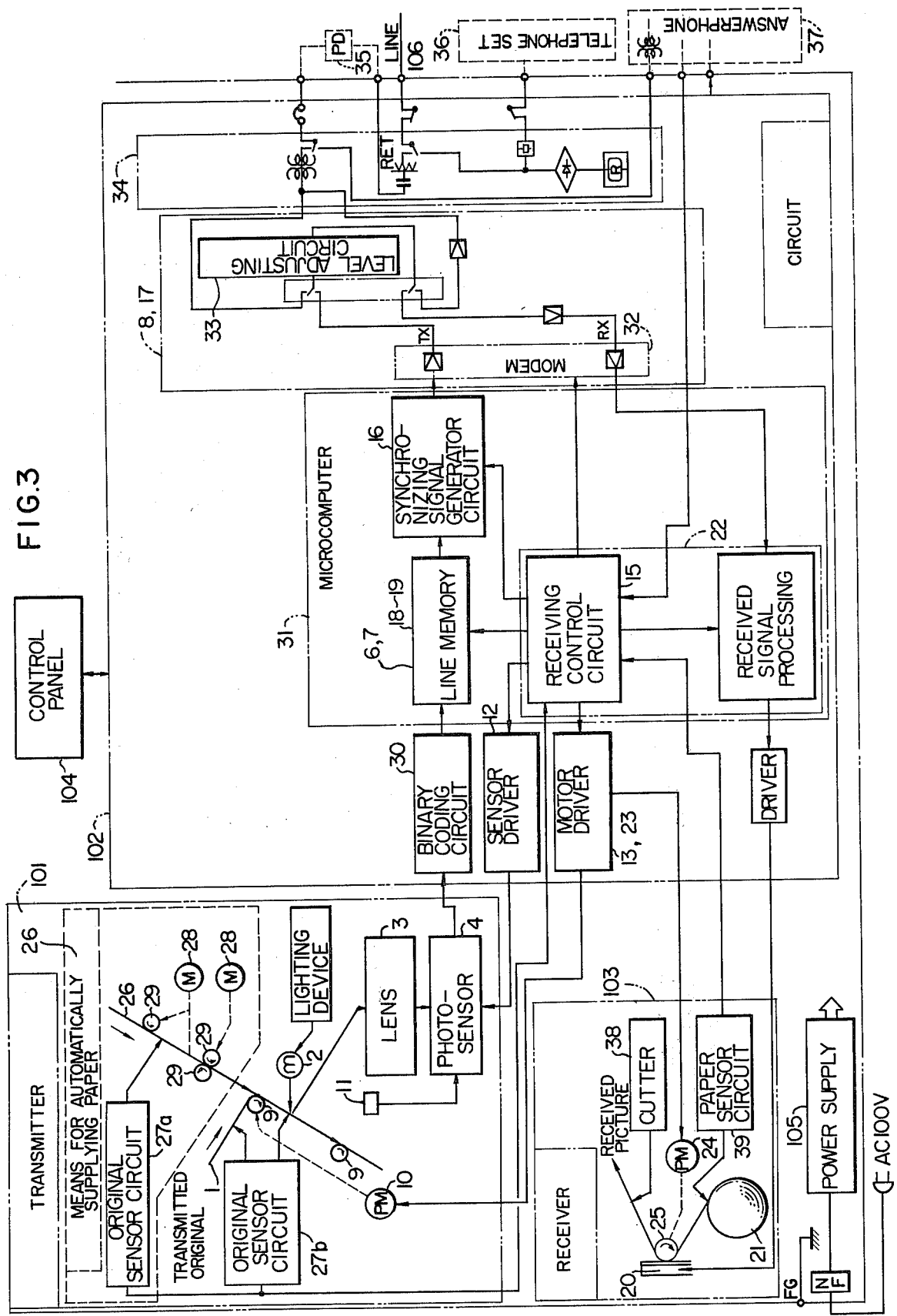
FIG. 3 is a diagram showing a more specific configuration of the transmission and receiving sections of the facsimile according to the present invention.

The above-mentioned relation between the transmission section and the receiving section is illustrated more specifically in FIG. 3, in which those components which are identical to those shown in FIGS. 1 and 2 are given the same identifying numerals as were used in FIGS. 1 and 2. Numeral 101 shows a transmitter section. Numeral 26 shows an automatic paper feeder for feeding the original automatically, numerals 27a and 27b original sensor circuits for detecting the presence or absence of an original, numeral 28 a motor for the automatic original feeder, and numeral 29 feed rollers. Numeral 102 shows a circuit section common to the transmitting and receiving sections. Numeral 30 shows a binary coding circuit for converting the image signal read from the sensor 4 into a binary signal of "1" or "0," numeral 31 a microcomputer including line memories 5 to 7 and 18 and 19, control circuits 15, and a synchronizing signal generator circuit 16, numeral 32 an analog modem, numeral 33 a level adjusting circuit, numeral 34 a circuit switching section, numeral 35 a channel protector, numeral 36 a telephone receiver, numeral 37 an answer phone, numeral 38 a cutter, numeral 39 a paper detector circuit, numeral 103 a receiver section, numeral 104 a control panel, and numeral 105 a power supply.

In this configuration, the transmitter section 101, the circuit section 102 and the receiver section 103 are controlled as described below by the control panel 104 and the microcomputer 31.

Figure 4:
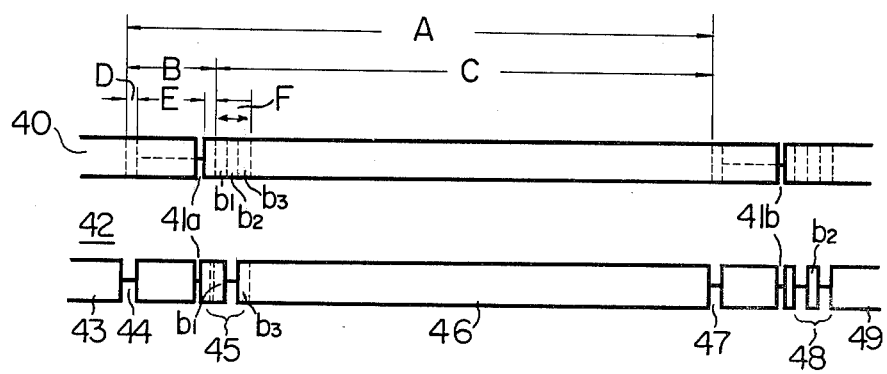
FIG. 4 shows a signal for transmission of the white background of the original.

A form of the transmission signal for the white background which is used in the circuit configuration of FIG. 3 is shown in FIG. 4. First, the signal transmitted through a channel takes the format 40 of the transmission signal shown in FIG. 4. As seen from the graph, one scanning period A is divided into a synchronizing section B and an image signal section C. The synchronizing section B is reversed in phase by 180 degrees at the synchronizing point 41a. The synchronizing section B includes the skip flag subsection in the initial part D thereof, and the image signal section includes the skip number indication flag subsection in the initial part F thereof, which comprises three bits of b1, b2 and b3, as a specific example thereof is shown in the transmission signal 42. During the image signal section 43, the image signal in the transmission line memory 7 is delivered, in parallel to which the sensor drive circuit 12 and the motor driver 13 are energized, thereby causing the sensor 4 to read a new line. When the white line judgement circuit 5 decides that the particular line is white, the control circuit 15 issues a common to read the next line. In this way, lines are read one by one. Assume that five white lines are read before the end of the image signal section 43. The skip flag 44 is provided, and the skip number indication flag 45 has b1 and b3 provided, indicating in coded form by the binary number "1, 0, 1" that five white lines are involved. Further, assume that during the signal section 46 the lines continue to be read and it is decided that two lines are white and three lines black. The image signal represented by the third line is stored in reading line memory 6 and the scanning is temporarily stopped. In the transmission signal, the next skip flag 47 is provided and the skip number indication flag 48 has b2 thereof provided, indicating in coded form by the binary number "0, 1, 0" that two white lines are involved. In the next following synchronizing subsection of the image signal section 49, an image signal is transferred from the reading line memory 6 to the transmission line memory 7. In this case, as described above, as the third line is made of video signal, there is not provided any skip flag, the information is delivered from the transmission line memory 7 during the image signal section.

During the image signal section, a new line is read, and if it contains black information, such information is stored in the reading line memory 6 and transferred to the transmission line memory 7 during the next synchronizing subsection. Under the above-mentioned conditions of the transmission section and the transmission signal, the receiving section operates as described below.

As shown in FIG. 4, the signals transmitted during the image signal section are stored in the receiving line memory 18 during the same section. In the meantime, the information of the preceding line is kept in the recording line memory 19 and recorded by the recording section 20. In the synchronizing subsection following the image signal section 43, the data in the receiving line memory 18 is transferred to the recording line memory 19. It will thus be noted that in the embodiment under consideration the received signal is recorded by one scanning period later. Since the skip flag 44 is provided immediately before the image section 46, the recording paper 21 is rapidly fed by driving the step motor 24 by five lines corresponding to the skip number indication flag 45 for recording the data in the image signal section 46. The data in the next image signal section 49 is also recorded in such a manner that since the skip flag 47 is provided, the recording paper 21 is fed rapidly by two lines corresponding to the number on the skip number indication flag 48. During the next image signal section where no skip flag is provided, the data is recorded and paper fed by one line.

Another embodiment of the present invention will be described in detail with reference to FIGS. 5A and 5B. The feature of the embodiment of FIG. 5A lies in that unlike the embodiment of FIG. 1, the memories are arranged in parallel rather than in series. FIG. 6 shows a time chart of the transmission signal of FIG. 5A.

Figure 7:
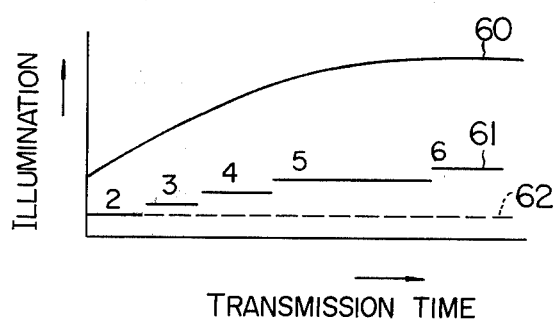
FIG. 7 is a diagram showing the relation between the illumination and the transmission time.
Figure 5A:
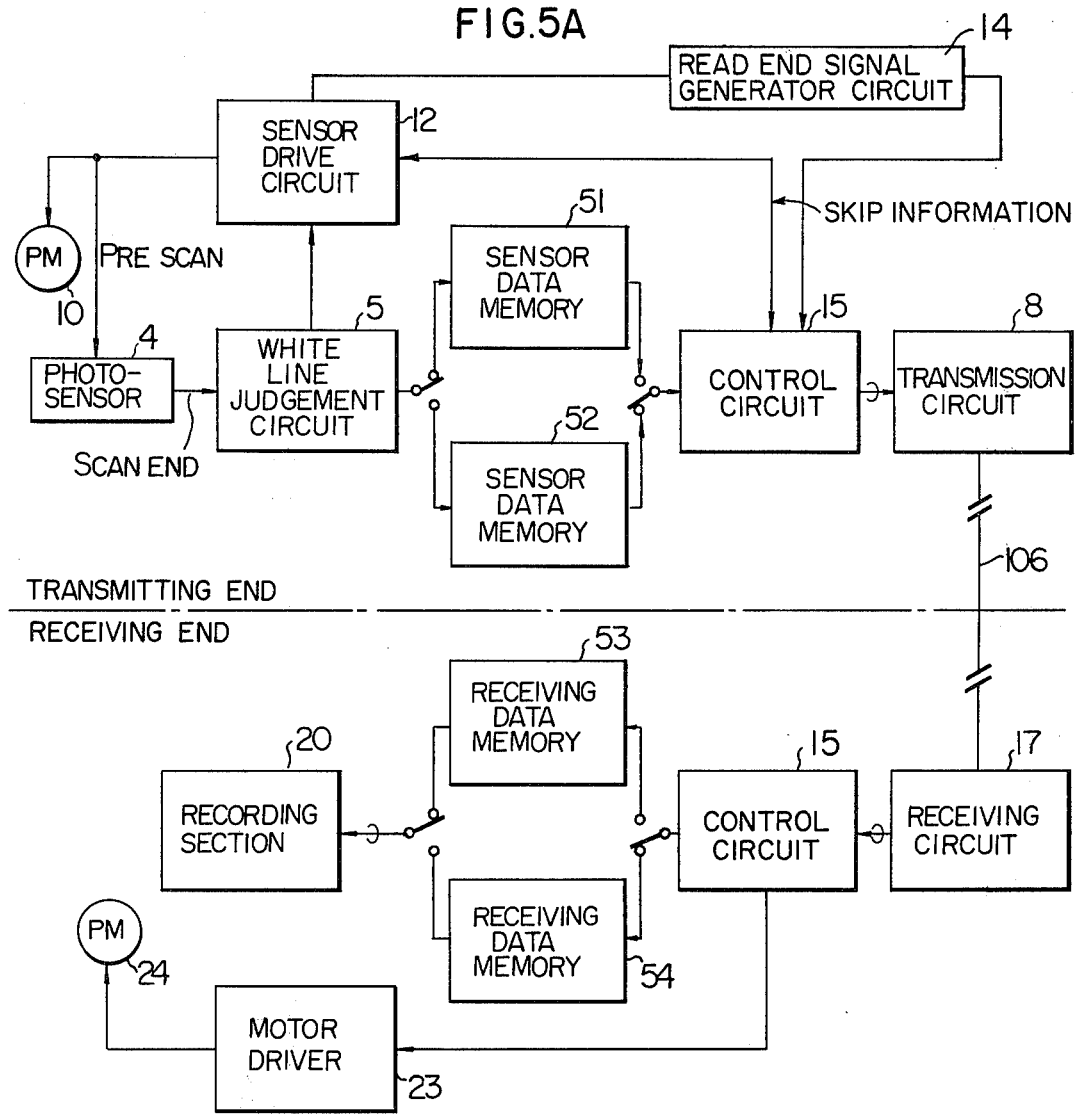
FIG. 5A is a block diagram showing another embodiment of the essential parts of the transmission and receiving sections of the facsimile according to the present invention.
Figure 5B:
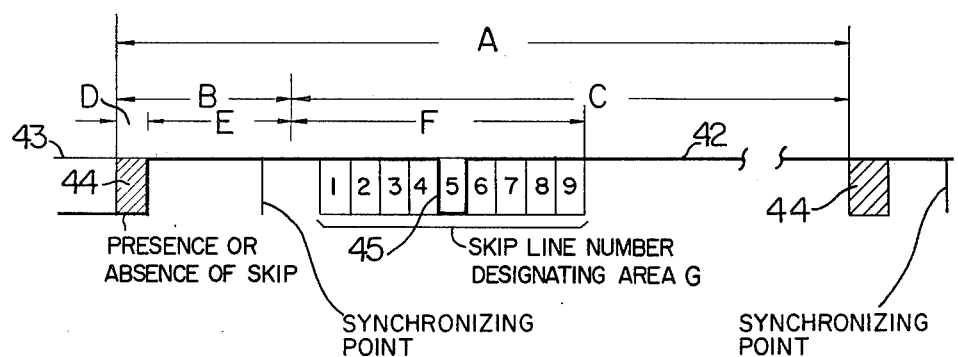
FIG. 5B shows another form of the signal for transmitting the white background of the original shown in FIG. 5A.
Figure 6:
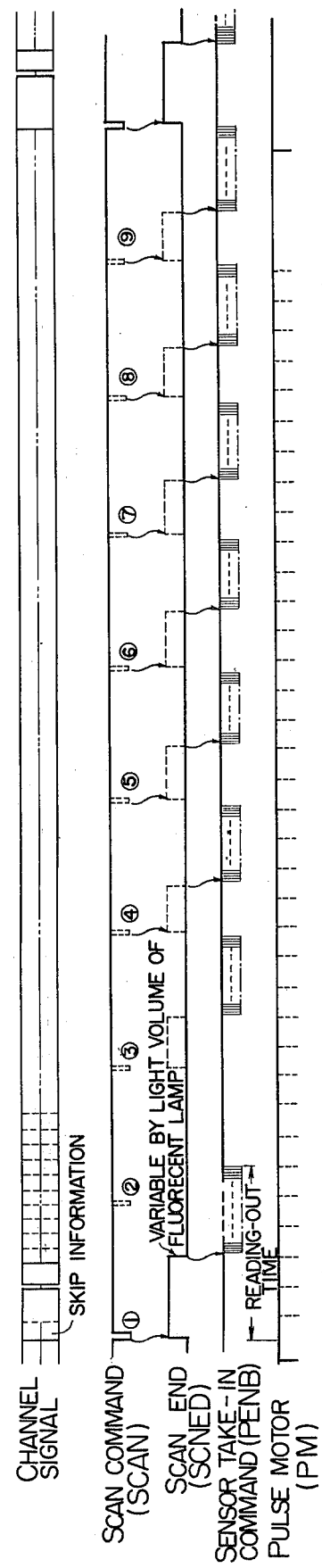
FIG. 6 is a time chart for the transmission signal.

In FIG. 5A, the image signal is read in the manner similar to FIG. 1. The original is illuminated by a fluorescent lamp. In accordance with the feed of the original, a scan command signal SCAN is applied from the transmission control circuit 15 through the sensor drive circuit 12 to the photo-sensor 4. In response to this command signal SCAN, the photo-sensor 4 scans the original, and the image information of one scan is temporarily stored in a register not shown in the drawing. When the scan end signal SCNED is applied from the read end signal generator circuit 14 to the control circuit 15, the image information of one scan stored in the register is transferred to the white line judgement circuit 5 by a certain number of bits in response to the sensor take-in command PENB. When it is decided that this line is white by the white line judgement circuit, the control circuit 15 delivers a scan command SCAN, thereby ordering the photo-sensor 4 to read the next line through the sensor drive circuit 12. If the transfer of the image data to the white line judgement circuit 5 during the period from the first scan command SCAN ① to the next scan command ② which are delivered at regular intervals as shown in FIG. 6, i.e., if the intensity of illumination of the fluorescent lamp 2 is reduced for some reason, then the read transfer may not be completed within the predetermined scan command section as will be explained later with reference to FIG. 7. In such a case, the scan command SCAN ② is not delivered, but the pulse motor is started in response to the next scan command SCAN ③, thereby reading the next line. In this way, lines are read successively, so that about nine lines may be scanned if white lines are continued until the end of the read image signal section A. Under the state of art, it is impossible to scan more than nine lines in view of the performance of the sensor and pulse motor. In the case where more than nine white lines continue, therefore, the similar operation is repeated from a given line in the next image signal section. FIG. 5B shows a form of transmission signal representing the white background in the embodiment of the present invention shown in FIG. 5A.

Assume that five white lines have been read until the end of the image signal section A. As in the preceding case, the skip flag 44 is provided in FIG. 5B indicating that the synchronizing subsection B involves white lines (with the channel signal being reduced to "low level" by a predetermined number of bits). Further, in the area G designating the number of skips in the initial part F of the image signal section C (for example, the section part representing a given number of bits divisible by a predetermined number of bits), the channel signal of the subsection of the predetermined number of bits subsequent to the initial part of the area G by the predetermined number of bits multiplied by four is reduced by low level in response to the command from the control circuit 15, so that the position of the skip number indication flag 45 indicates that the number of white lines is "5."

Assume that black information is contained in the lines read in response to the first scan command of the next image signal section. The image data is temporarily stored in the register from the photo-sensor 4 as mentioned above, and transferred through the white line judgement circuit 5 to the sensor data memory 51 shown in FIG. 5A, thus temporarily stopping the read scanning operation. The image data stored in the sensor data memory 51 fails to provide the skip flag but is applied to the channel 106 through the transmission circuit 8 during the next image signal section.

In the beginning of the synchronizing subsection B immediately before the next image signal section C, the reading of the next line is designated by the control circuit 15 in a manner similar to the preceding case. If that line contains black information, the image information is transferred to another sensor data memory 52 from the white line judgement circuit 5. If the subsequent line contains black information, the image information is transferred to the sensor data memory 51 which has already delivered the preceding image information, in response to the command of the control circuit 15.

At the receiving end, the signal transmitted during the image signal section A is stored in the receiving data memory 54 if the data of the preceding line is still kept in the receiving data memory 53. In the meantime, the information of the preceding line is recorded from the receiving data memory 53 by the recording section 20. In this embodiment, as in the embodiment of FIG. 2, the recording of the received signal is delayed by one scanning period. In the case of white lines, the skip flag 44 is provided in the synchronizing subsection B and the flag 45 in the image signal section C indicating the number of skips. From the image signal received through the receiving circuit 17, therefore, the receiving control circuit 22 decides that the number of skips is "5", so that the pulse motor 24 is driven by five steps through the motor driver 23, thus feeding the recording paper 21 rapidly by five lines.

The relation between the intensity of illumination of the fluorescent lamp and the number of white lines read during one scanning period as mentioned above is shown in FIG. 7. The intensity of illumination of the fluorescent lamp undergoes a change due to flicker caused by the frequency of the power supply under the normal condition and the isothermal change at the initial stage of illumination. In accordance with the intensity of illumination, therefore, the number of white lines to be read is varied from two to six as designated by numeral 61. This variation is performed by controlling the reading system by use of the signal from the read end signal generator circuit 14. If the number of lines read is to be fixed instead of being varied, the reading system is set at the number of lines associated with the lowest intensity of illumination of the fluorescent lamp as shown by 62 representing the fixed number of lines to be read, with the result that the data read fails to change or to be deteriorated due to the change in the intensity of illumination of the fluorescent lamp.

Figure 8A:
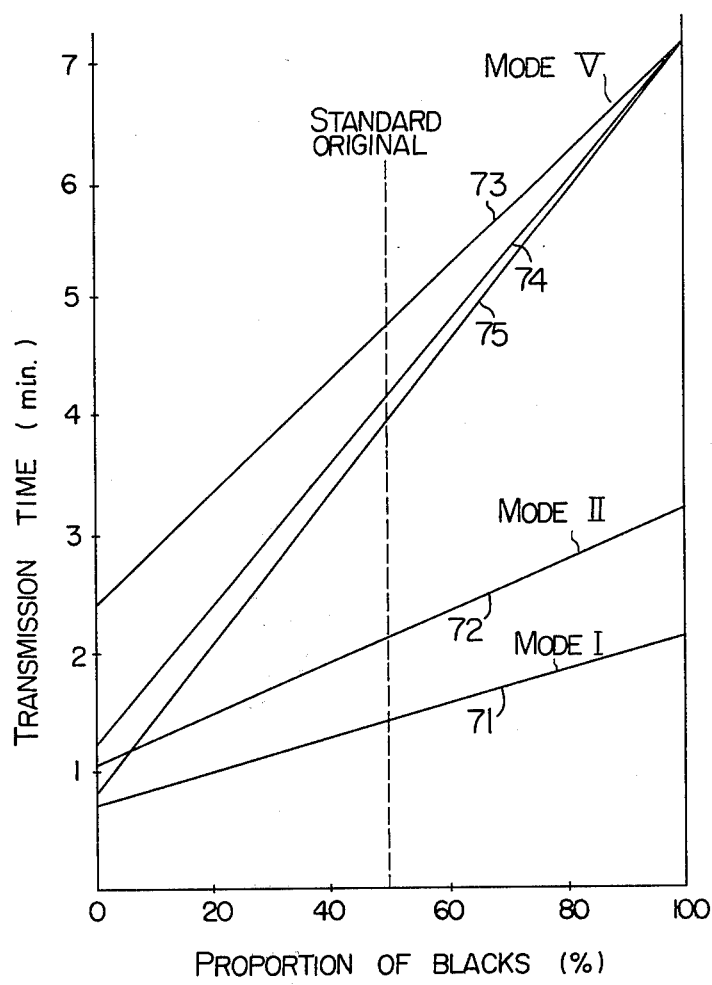
FIG. 8A is a graph showing the relation between the transmission time and the proportion of blacks.

The variation in transmission time associated with the skipping of white lines is shown in FIG. 8A. In this drawing, reference numerals 71 and 72 show the relation between the ratio of the lines containing black and the transmission time at the maximum number of skips in transmission mode I (motor speed of 54 PPS) and transmission mode II (motor speed of 36 PPS) respectively. Numerals 73, 74 and 75 show the relation between the proportion in percentage of the lines containing black and the transmission time in minutes for three, six and nine skips in transmission mode V (motor speed of 16 PPS) respectively. According to the white line skip system according to the present invention, it will thus be seen that the transmission time is reduced to a length ranging from about one half as compared with the time for a typical original in mode I to about one fifth for the skip number of 9 in mode V.

Figure 8B:
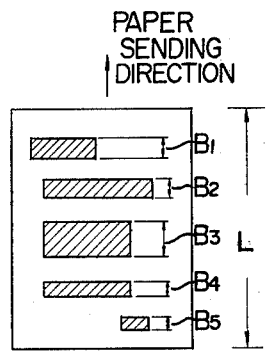
FIG. 8B is a diagram showing the percentage which black lines represent of the transmitted original information containing the white background.

FIG. 8B is for explaining the proportion of black lines which represents of the transmitted original information shown by the abscissa of the graph of FIG. 8A. In FIG. 8B, the arrow shows the direction of feed of the original represented by a transmission signal containing white background.

Let the length of the original along the direction of feed be L, and the widths of the black lines along the direction of feed be B1, B2, B3, B4 and B5 respectively. The proportion of the black lines is given as $$R = (B1 + B2 + B3 + B4 + B5)/L$$

It will be understood from the foregoing description that according to the present invention, those lines of the original which contain no image are read at a speed several times higher than in the conventional systems. In other words, in view of the fact that one scanning line period takes 166.6 milliseconds and that it takes 10 to 15 milliseconds to read one line under the stable condition of the fluorescent lamp, the white background is read at a maximum speed about ten times higher than the other parts of the original. Also, taking into consideration the fact that the brightness of the fluorescent lamp depends to a large measure on the temperature of the bulb wall so that the brightness is reduced to about one tenth of the maximum value at the temperature of 0° C. of the bulb wall, the number of lines read is varied in accordance with the brightness of the fluorescent lamp, thus always making possible the highest possible reading.

We claim:

1. A skip type analog facsimile system comprising:
    means for feeding an original document having lines of data, a light source illuminating said original document, a photo-sensor scanning said document on a line-by-line basis for converting image information for every one line in the original document fed by said feeding means into an electrical signal;
    a white line judgement circuit connected to said photo-sensor for judging whether the image information representing each one line read out by said photo-sensor is a white line containing no data or a black line containing data;
    a reading line memory connected to said white line judgement circuit for temporarily storing the image information passing through said white line judgement circuit;
    a transmitting circuit for sending modulated image information on a transmission line;
    a transmission line memory for reading out the image information stored in said reading line memory as a series of image information transmissions each having a predetermined period corresponding to a line of image information and for transmitting the image information through said transmitting circuit at the speed corresponding to the transmitting speed of the transmission line;
    a detection circuit for detecting a change in the brightness of said light source illuminating said original document and for controlling the speed of scanning by said photo-sensor in accordance with the detected result;
    a transmitter control circuit responsive to said white line judgment circuit for indicating in selected image information transmissions a skip indication designating the presence of at least one white line and the number of consecutive white lines read out of said reading line memory during said predetermined period in such a way that the white line image information is synchronized with the black line image information in the transmission;
    a receiving circuit for receiving and demodulating the image information transmitted on said transmission line;
    a receiving line memory for temporarily storing the demodulated image information;
    a recording circuit for recording image information on recording paper;
    a recording line memory for reading out the image information stored in said receiving line memory to said recording circuit for making a record thereof on said recording paper;
    means for feeding said recording paper at a controlled speed; and
    a receiver control circuit comprising a controlling circuit for synchronizing said receiving line memory, said recording line memory, said recording circuit and said means for feeding the recording paper in accordance with the received image information including said skip information and the number of the white lines indicated in said skip information.

2. A skip type analog facsimile system according to claim 1, wherein the number of white lines is indicated in coded form in the image information transmission.

3. A skip type analog facsimile system according to claim 1, wherein the number of white lines is indicated by providing a flag in a given part of a designated skip line area in the image information transmission.

* * * * *